United States Patent [19]

Wössner et al.

[11] Patent Number: 4,643,011
[45] Date of Patent: Feb. 17, 1987

[54] METHOD OF MANUFACTURING A CYLINDER MEMBER OF A CYLINDER PISTON UNIT

[75] Inventors: Wössner, Schweinfurt; Wolfgang Geiling, Schonungen-Hausen, both of Fed. Rep. of Germany

[73] Assignee: Fichtel & Sachs AG, Schweinfurt, Fed. Rep. of Germany

[21] Appl. No.: 647,985

[22] Filed: Sep. 6, 1984

[30] Foreign Application Priority Data

Sep. 7, 1983 [DE] Fed. Rep. of Germany ....... 3332216

[51] Int. Cl.$^4$ .............................................. B21D 17/04
[52] U.S. Cl. ......................................... 72/113; 72/117
[58] Field of Search .............. 188/316, 322.18, 322.19; 92/260 R; 72/113, 75, 115, 117, 208, 210, 220

[56] References Cited

U.S. PATENT DOCUMENTS

| | | | |
|---|---|---|---|
| 376,057 | 1/1888 | Allen | 72/220 |
| 649,341 | 5/1900 | Nevill | 72/113 |
| 1,774,231 | 8/1930 | Harnsberger | 72/113 |
| 1,828,383 | 10/1931 | Anderson | 188/316 |
| 2,625,065 | 1/1953 | Trishman | 72/111 |
| 3,499,505 | 3/1970 | De Carbon | 188/322.18 |
| 3,782,157 | 1/1974 | Foulks et al. | 72/113 |

FOREIGN PATENT DOCUMENTS 2741799 11/1978 Fed. Rep. of Germany .
8010803 11/1981 France .

Primary Examiner—Lowell A. Larson
Attorney, Agent, or Firm—Toren, McGeady and Goldberg

[57] ABSTRACT

In gas springs, shock absorbers and the like, the cylinder member may be provided with an interconnection groove on its internal face. This groove is to interconnect two working chambers on both sides of a piston member movably received within the cylinder member. This interconnection groove is produced by a roller member introduced into the cavity of the cylinder member and having an axis substantially perpendicular to the axis of the cylinder member. The roller member has an annular elevation on its circumferential surface which is to engage the internal face of the cylinder member. A support face profiled according to the profile of the external face of the cylinder member is brought into contact with the external face of the cylinder member. The elevation of the roller member is angularly aligned with a metal receiving groove of the support face. The roller member is hereupon radially pressed against the internal face of the cylinder member and axially moved corresponding to the axial length of the interconnection groove to be obtained. So, the interconnection groove is generated by an embossing action and the metal corresponding to the interconnection groove being obtained is urged to flow into the metal receiving groove.

10 Claims, 3 Drawing Figures

METHOD OF MANUFACTURING A CYLINDER MEMBER OF A CYLINDER PISTON UNIT

BACKGROUND OF THE INVENTION

Cylinder piston devices like gas springs, vibration dampers, shock absorbers, suspension struts and the like comprise a cylinder member and a piston member within the cavity of the cylinder member. The piston member is axially movable along the axis of the cylinder member. Working chambers are defined on both sides of the piston member within the cavity defined by the cylinder member. A damping fluid, namely a damping liquid or gas, is contained in the two working chambers. This damping fluid is to flow from one working chamber to the other when the piston member moves. For interconnecting the two working chambers, a flow path bridging the piston member is necessary. This flow path can be established by an interconnection groove within the internal face of the side wall of the cylinder member. It is rather difficult to produce such an interconnection groove with the desired high precision on the one hand and the low expenses required for such a mass product on the other hand. The high precision is necessary in view of sealingly guiding the piston member on the internal face of the cylinder member on the one hand and in view of precisely defining desired damping characteristics on the other hand.

STATEMENT OF THE PRIOR ART

In the past, the interconnection grooves have been produced both by machining and noncutting shaping.

In machining the cylinder member, the wall thickness of the cylinder member is attenuated and a sharp-edged transition between the interconnection groove and the internal face is obtained. The wall attenuation is particularly disadvantageous in case of thin-walled cylinder members such as are used in shock absorbers, particularly in double-tube shock absorbers.

In using noncutting shaping methods, it is very difficult to obtain the required groove dimensions and it is further difficult to protect the utilized tools from premature wear. Moreover, it is difficult to maintain during the shaping step the profile of the internal face which is necessary for properly guiding the cylinder member thereon. Finishing operations are therefore frequently necessary after a noncutting shaping operation. As a result of such finishing operation and inavoidably high control expenditure, the known methods based on noncutting shaping are expensive.

OBJECT OF THE INVENTION

It is an object of the invention to provide a method for manufacturing the cylinder members which avoids the disadvantages of the known manufacturing methods. More particularly, it is a main object of the invention to obtain highly precise dimensions of the interconnection groove. A further object is to protect the utilized tools from premature wear. A further object is to avoid wall thickness attenuation. A further object is to provide burr-free edges at the transition between the groove and the internal face of the cylinder member without finishing work. A further object is to render possible groove production at a favourable price. A further object is to produce relatively short grooves with entry and exit slopes.

SUMMARY OF THE INVENTION

A cylinder piston unit is to be manufactured. The cylinder piston unit comprises besides the cylinder member a piston member within the cylinder member. The cylinder member has a cylinder axis and a side wall with an internal face and with an external face. The internal face surrounds a cavity. The piston member is axially movable within the cavity and defines two working chambers within the cavity. The working chambers are interconnected across the piston member by at least one interconnection groove in the internal face of the side wall. The interconnection groove extends substantially parallel to the cylinder axis.

In view of at least one of the above-mentioned objects, the method of this invention starts from a substantially cylindrical tube member having a cylinder axis and substantially smooth internal and external faces. This tube member is supported by its external face on a support face having a profile adapted to the external face. This support face is provided with a metal receiving groove to be covered by the tube member. A roller member is introduced into the cavity. The roller member has a roller axis substantially perpendicular with respect to the cylinder axis and a circumferential face at least partially defined by a radially projecting annular elevation. The radially projecting elevation is angularly aligned with the metal receiving groove of the support face. The roller member is pressed in a direction radial with respect to said cylinder axis into engagement with the internal face of the side wall while simultaneously moving the roller member along the cylinder axis. The roller member is rotated by the engagement with the internal face during the axial movement. So, the interconnection groove is embossed into the internal face of the tube member and the metal corresponding to the interconnection groove being obtained is urged to flow into the metal receiving groove. It is to be noted that this invention includes the possibility of only bending the tube material. In view of high precision of the groove profile to be obtained, a preferred method of the invention includes a real embossing in which the wall thickness is varied and the metal is subject to cold flowing. Due to this cold flowing, a low stress zone is obtained in the region of the interconnection groove. The circularity of the tube is maintained and the groove dimensions are highly precise. The transitions from the interconnection groove to the adjacent areas of the internal face are compact and more particularly burr-free so that optimum prerequisites are provided for a wear-free co-operation with the piston surface or the surface of a piston ring.

A roller member may be used having annular downholder faces on both sides of the annular elevation. These downholder faces can engage the internal face when the annular elevation has entered into the internal face down to the depth of the interconnection groove. By such downholder faces the circularity of the cylinder member is further improved and burr-freeness is warranted. Moreover, the roller member gets additional axial width so that reduced bearing stresses are obtained. This increases the lifetime of the roller member.

Optimum circularity of the cylinder member may be obtained by using an annular support tube as a support face, said support tube having two ends and surrounding the tube member to be shaped.

The slopes of the interconnection groove may be obtained by the circular shape of the elevation at the beginning and at the end of the groove forming step. Moreover, it is possible by varying the radial position and the radial pressure to vary the depth of the interconnection groove. This may involve the necessity of providing a metal receiving groove of correspondingly varying profile.

According to this method, it is possible to provide a plurality of interconnection grooves in the internal face of the cylinder member. If these grooves are provided at a small peripheral distance from each other and have the same axial length they may be provided in one embossing step. If on the other hand the grooves are at a greater angular distance from each other and/or have different axial lengths it is preferred to make these grooves one after the other. By a plurality of grooves having different profiles and varying lengths the damping characteristics may be varied.

The method of this invention requires a highly rigid roller carrier and a very rigid bearing between the roller carrier and the roller member. The dimensions of the roller carrier and the bearing are restricted due to the necessity of introducing the roller into the tube member. One will preferably use almost the total internal cross-section of the tube for the profile of the roller carrier. At the location of the roller, one has to make a compromise between the rigidity of the roller carrier and the rigidity of the bearing. The roller member may comprise bearing pins integral therewith. Alternatively, the roller member may be rotatably mounted on a bearing pin fastened to the roller carrier. In case of manufacturing a tube member having both ends open the roller carrier extends through both open ends of the tube member. In this case, the roller carrier may be guided both axially and radially at both ends thereof. So, the problem of bending deflection is considerably reduced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to the example embodiment. In detail.

DESCRIPTION OF THE PREFERRED EMBODIMENT

Figure 1:
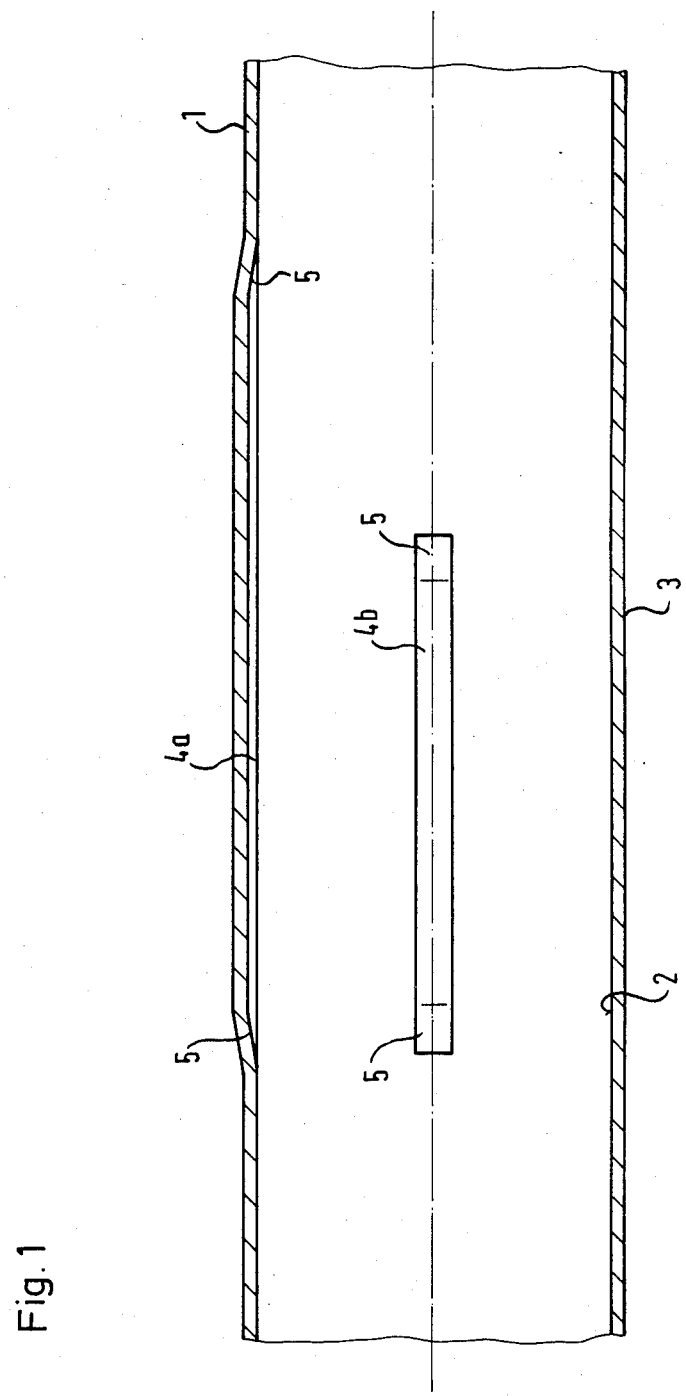
FIG. 1 shows a longitudinal section through a cylinder member of a cylinder piston unit with two elongated interconnection grooves.

The cylinder member 1 of a vibration damper as shown in FIG. 1 possesses axially extending interconnection grooves 4a, 4b on the internal face 2 of the wall. These interconnection grooves 4a, 4b have different axial lengths and are provided with entry and exit slopes 5. The cylinder 1 is provided with an external face 3.

Figure 2:
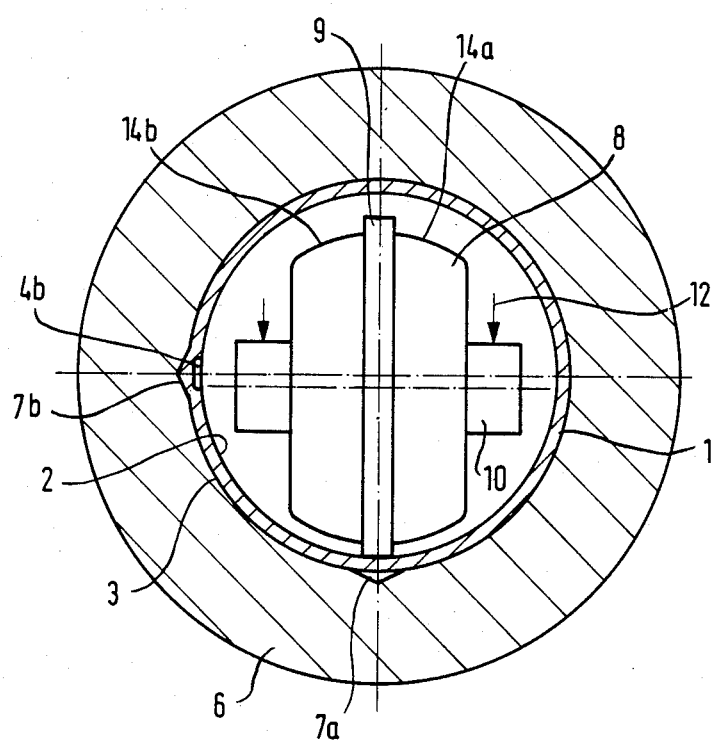
FIG. 2 shows in a diagrammatic manner and in a cross-sectional view an installation for manufacturing an interconnection groove according to the method of this invention, the tube member corresponding to the tube member of FIG. 1.
Figure 3:
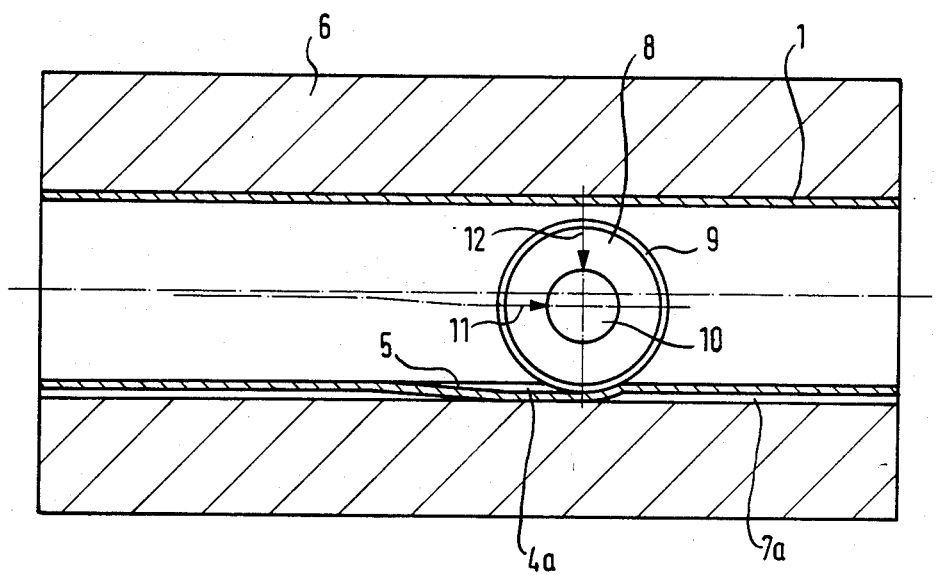
FIG. 3 shows a longitudinal section of the installation of FIG. 2.

The production method is clarified in FIG. 2. For this purpose, an annular support tube 6 adapted in profile to the external face 3 of the cylinder 1 is arranged which is provided with metal receiving grooves 7a, 7b in the region of the interconnection grooves 4a, 4b to be obtained. In the cavity of the cylinder 1 there is situated a roller member 8 which is mounted rotatably on a spindle 10 and possesses a radially projecting annular elevation 9 adapted to the desired form of the interconnection groove 4a to be obtained.

The interconnection groove 4b already completed on the left side of FIG. 2 shows that in the production method the material of the cylinder 1 was urged to flow into the metal receiving groove 7b of the support tube 6 and completely fills out the latter. The roller member 8 has a width amounting to a multiple of the radially projecting annular elevation 9. For the production of the interconnection groove 4a the roller member 8 is located at the beginning of the groove, as represented in FIG. 2. Then the roller member 8 is pressed by a roller carrier (not shown) with the radially projecting annular elevation 9 so strongly in the direction of arrow 12 against the internal face 2 of the cylinder 1 that the material of the cylinder 1 flows into the metal receiving groove 7a. Moreover, the roller member 8 is axially moved in the direction of arrow 11. The cranked-dotted line with the arrow 11 indicates the movement of the roller member 8 during the embossing operation. This movement is imparted to the roller carrier (not shown) and therewith to the roller member 8 by radial and axial guiding and adjusting means (not shown) guiding the roller carrier in axial and radial direction. These radial and axial guiding and adjusting means are provided outside the cylinder 1 at one or preferably at both ends thereof. The slope 5 is determined by the amount of radial and axial movement of the roller member 8 at the beginning of the groove shaping.

Since in the production of the interconnection groove the material of the cylinder 1 cannot flow freely but is forced into and fills out the metal receiving groove 7a of the support tube 6, the controlled flow process realizes a precise retention of the groove dimensions without appreciable influence upon the circularity of the cylinder 1. With this method, a smooth, burr-free and compacted surface for the interconnection groove and its transition to the internal face 2 of the cylinder 1 is produced.

The roller member 8 may be provided with downholder faces 14a, 14b adapted to the internal face 2 of the cylinder member 1. By such downholder faces 14a, 14b the circularity may still be further improved.

In view of removing the cylinder member 1 from the support tube 6, the metal receiving grooves 7b may extend beyond the ends of the interconnection grooves 4a, 4b to be obtained at least in one direction up to the respective end of the annular support tube 6. So, the cylinder member 1 may be pushed out of the annular support tube 6 after termination of the embossing step, the metal flown into the metal receiving grooves 7a, 7b being slided along the metal receiving grooves 7a, 7b up to the open end thereof.

Alternatively, the annular support tube 6 may be divided into two halves along a plane containing the axis of the cylinder member 1. In this case, the metal receiving grooves 7a, 7b may correspond not only in cross-section but also in axial length to the shape of the interconnection grooves 4a, 4b to be obtained. This may have some advantages in so far as the cylinder member 1 is supported by the annular support tube 6 also in the area of the terminal slopes of the interconnection grooves 4a, 4b.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A method of manufacturing a cylinder member (1) of a cylinder piston unit,
    said cylinder piston unit comprising said cylinder member (1) and a piston member received by said cylinder member (1);
    said cylinder member (1) having a cylinder axis and a side wall with an internal face (2) surrounding a cavity and an external face (3);
    said piston member being axially movable within said cavity and defining two working chambers within said cavity, said working chambers being interconnected across said piston member by an interconnection groove (4a, 4b) in said internal face (2) of said wall, said interconnection groove (4a, 4b) extending substantially parallel to said cylinder axis and having terminal entry and exit slopes (5, 5) inclined from said internal face (2) to the base of said interconnection groove;
    said method comprising:
        providing a substantially cylindrical tube member (1) having said cylinder axis and substantially smooth internal and external faces (2, 3);
        supporting said tube member (1) by its external face (3) on a support face having a profile adapted to said external face (3), said support face being provided with a metal receiving groove (7a, 7b) extending in the direction of the cylinder axis to be covered by said tube member (1) and having an axial length and shape conforming to the axial length and shape of the interconnecting groove including the entry and exit slopes thereof;
        introducing a roller member (8) into said cavity, said roller member (8) having a roller axis substantially perpendicular with respect to said cylinder axis and a circumferential face extending continuously along a closed circle concentrically about the roller axis and defined by a radially outwardly projecting annular elevation (9) and an annular downholder face located on each of the opposite sides of said annular projection and spaced radially inwardly of said projection, said downholder faces (14a, 14b) having when regarded in a section containing the roller axis—a radius of curvature substantially corresponding to said internal face (2);
        angularly aligning said elevation (9) with said metal receiving groove (7a, 7b) of said support face; and
        pressing said roller member (8) in a direction radial with respect to said cylinder axis and at a location spaced from the ends of said cylinder member into engagement with the internal face (2) of said side wall while simultaneously moving said roller member (8) along said cylinder axis such as to be rotated about its roller axis and embossing said interconnection groove (4a, 4b) including the entry and exit slopes thereof (5, 5) into said internal face (2) of said tube member (1), and said downholder faces engaging said internal faces of said tube on both sides of said annular elevation and rotating with said roller as said elevation presses said tube member into the depth of said interconnection groove determined by the depth of said receiving groove between the entry and exit slopes with the metal corresponding to said interconnection groove (4a, 4b) being urged to flow into said metal receiving groove (7a, 7b).

2. A method as set forth in claim 1, wherein defining said support face by an annular support tube (6) having two ends and surrounding said tube member (1).

3. A method as set forth in claim 2, including dividing said annular support tube (6) into two tube halves along a plane containing said cylinder axis, and separating said tube halves from each other for removing said cylinder member (1) from said annular support tube (6).

4. A method as set forth in claim 1, wherein a plurality of interconnection grooves (4a, 4b) embossing into said internal face (2) one after the other.

5. A method as set forth in claim 4, including forming said interconnection grooves (4a, 4b) with varying lengths along said cylinder axis.

6. A method of manufacturing a cylinder member (1) of a cylinder piston unit,
    said cylinder piston unit comprising said cylinder member (1) and a piston member received by said cylinder member (1);
    said cylinder member (1) having a cylinder axis and a side wall with an internal face (2) surrounding a cavity and with an external face (3);
    said piston member being axially movable within said cavity and defining two working chambers within said cavity, said working chambers being interconnected across said piston member by an interconnection groove (4a, 4b) in said internal face (2) of said side wall, said interconnection groove (4a, 4b) extending substantially parallel to said cylinder axis and having terminal entry and exit slopes (5, 5) inclined from said internal face (2) to the base of said interconnection groove;
    said method comprising:
        providing a substantially cylindrical tube member (1) having said cylinder axis and substantially smooth internal and external faces (2, 3);
        supporting said tube member (1) by its external face (3) on a support face having a profile adapted to said external face (3), said support face being provided with a metal receiving groove (7a, 7b) extending in the direction of the cylinder axis to be covered by said tube member (1) and having an axial length and shape conforming to the axial length and shape of the interconnecting groove including the entry and exit slopes thereof;
        introducing a roller member (8) into said cavity, said roller member (8) having a roller axis substantially perpendicular with respect to said cylinder axis and a circumferential face extending continuously along a closed circle concentrically about the roller axis and defined by a radially outwardly projecting annular elevation (9) and an annular downholder face located on each of the opposite sides of said annular projection and spaced radially inwardly of said projection, said downholder faces (14a, 14b) having—when regarded in a section containing the roller axis—a radius of curvature substantially corresponding to said internal face (2);

angularly aligning said elevation (9) with said metal receiving groove (7a, 7b) of said support face; and pressing said roller member (8) in a direction radial with respect to said cylinder axis and at a location spaced from the ends of said cylinder member into engagement with the internal face (2) of said side wall while simultaneously moving said roller member (8) along said cylinder axis such as to be rotated about its roller axis and embossing said interconnection groove (4a, 4b) including the entry and exit slopes thereof into said internal face (2) of said tube member (1), and said downholder faces engaging said internal faces of said tube on both sides of said annular elevation and rotating with said roller as said elevation presses said tube member into the depth of said interconnection groove determined by the depth of said receiving groove between the entry and exit slopes with the metal corresponding to said interconnection groove (4a, 4b) being urged to flow into said metal receiving groove (7a, 7b) and radially moving said roller member (8) with respect to said cylinder axis while axially moving said roller member along said cylinder axis such as to obtain an interconnection groove (4a, 4b) of variable depth with respect to said internal face at least adjacent one end of said interconnection groove (4a, 4b).

7. A method as set forth in claim 6, wherein defining said support face by an annular support tube (6) having two ends and surrounding said tube member (1).

8. A method as set forth in claim 7, including dividing said annular support tube (6) into two tube halves along a plane containing said cylinder axis and separating said tube halves from each other for removing said cylinder member (1) from said annular support tube (6).

9. A method as set forth in claim 6, wherein embossing a plurality of interconnection grooves (4a, 4b) into said internal face (2) one after the other.

10. A method as set forth in claim 9, including forming said interconnection grooves (4a, 4b) with varying lengths along said cylinder axis.

* * * * *